United States Patent [19]

Mandet et al.

[11] Patent Number: 4,825,641

[45] Date of Patent: May 2, 1989

[54] CONTROL MECHANISM FOR INJECTOR DIAPHRAGMS

[75] Inventors: Gérard M. F. Mandet, Fericy; Rodolphe Martinez, Perigny S/Yerres, both of France

[73] Assignee: Societe Nationale d'Etude et de Construction de Moteurs d'Aviation (SNECMA), Paris, France

[21] Appl. No.: 69,103

[22] Filed: Jul. 2, 1987

[30] Foreign Application Priority Data

Jul. 3, 1986 [FR] France ................................ 86 09652

[51] Int. Cl.$^4$ ............................ F02C 9/00; F02C 1/00

[52] U.S. Cl. ...................................... 60/39.23; 60/748

[58] Field of Search ................. 60/39.23, 39.37, 39.36, 60/748, 39.29; 239/402.5; 137/601; 415/159

[56] References Cited

U.S. PATENT DOCUMENTS

| | | | |
|---|---|---|---|
| 3,490,230 | 1/1970 | Pillsbury et al. | 60/748 |
| 3,723,049 | 3/1973 | Juricek | 239/402.5 |
| 3,932,110 | 1/1976 | Waddell | 239/402.5 |
| 4,534,166 | 8/1985 | Kelm et al. | 60/39.23 |
| 4,696,157 | 9/1987 | Barbier et al. | 60/39.23 |
| 4,726,182 | 2/1988 | Barbier et al. | 60/39.23 |
| 4,754,600 | 7/1988 | Barbier et al. | 60/39.23 |
| 4,766,722 | 8/1988 | Bayle-Laboure et al. | 60/39.23 |

FOREIGN PATENT DOCUMENTS

| | | | |
|---|---|---|---|
| 214003 | 3/1987 | European Pat. Off. | 60/748 |
| 2085147 | 4/1982 | United Kingdom | 60/748 |

*Primary Examiner*—Donald E. Stout

*Attorney, Agent, or Firm*—Bacon & Thomas

[57] ABSTRACT

A control mechanism for injector diaphragms in a turbojet engine is disclosed wherein an annular fairing is utilized to synchronize the movement of the individual air-fuel injector diaphragms. The fairing member is interconnected to each of the diaphragms and a single control element controls the rotational movement of the annular fairing. This minimizes the turbulence of the air flow passing around the control system.

17 Claims, 3 Drawing Sheets

CONTROL MECHANISM FOR INJECTOR DIAPHRAGMS

BACKGROUND OF THE INVENTION

Rigid anti-pollution requirements of international environmental protection standards have led aircraft engine designers to search for ways to reduce the pollution in turbojet engine exhaust gases. One solution is to continuously adapt the distribution of the air flow which forms the fuel-air mixture by means of mobile flaps or diaphragms to vary the inlet area of the injector air intakes as a function of the operational parameters of the engine.

U.S. Pat. No. 4,726,182 illustrates a known variable-geometry injection system. In this system, the diaphragm is supported on the outer swirler of each of the injectors and is positioned by a lever controlled by a fork supported by a shaft pivotally attached to the chamber casing. There is a separate control device passing through the casing for each of the injector diaphragms, with the synchronization of the motion of all of the injection systems achieved by a synchronizing ring located externally of the combustion chamber casing.

Although this system has effectively reduced the exhaust emissions of the engine, the large number of link rods, forks and other levers in the air flow path (which are equal to the number of injectors) interfere with the flow of cooling gases over the outer wall of the combustion chambers. The large number of control elements passing through the engine casing all require sealing to prevent excess air leakage, which renders the system unduly complex.

In other systems, the motion of the diaphragms are synchronized by a ring located between the combustion chamber casing and the outer chamber wall which interconnects the control levers of the diaphragms. This design also interferes with the flow path of the outer wall cooling gases and prevents the formation of a uniform cooling film.

French Pat. No. 2,491,140 discloses a control system incorporating an external ring seated on a roller bearing which rests on a cylindrical bearing of the combustion chamber. While this system offers the advantage of simplicity, it requires the diaphragm-driving lever to pass through the cylindrical bearing of the combustion chamber and the roller bearing, rendering it difficult to achieve a practical embodiment of this system. Also, the cooling air is poorly guided on the outer chamber wall and toward the outer swirler of the injector by the presence of an annular cavity formed by the cylindrical bearing supporting the drive ring, this cavity forming a blind hold around the injector which creates uncontrollable perturbations hampering the air guidance toward the swirler.

SUMMARY OF THE INVENTION

The present invention relates to an improved control means for gas turbine engine combustion chambers with variable-geometry injectors which eliminates the drive rings located in the flow path between the chamber casing and an outer chamber wall. The present invention also avoids control rings external to the casing.

The system according to the invention includes an annular fairing member having a curved cross-section which divides the air flow into a first portion which flows into the air-fuel injectors and a second portion which passes over an outer wall of the combustion chamber to form a peripheral film. The system effectively controls the diaphrams without interfering with the formation of the cooling film.

The system according to the invention is utilized in a gas turbine engine having an annular combustion chamber with a plurality of air-fuel injectors arranged in an annular array around the front or upstream end of the combustion chamber. Each of the air-fuel injectors has an axis which extends substantially parallel to the longitudinal axis of symmetry of the combustion chamber. Each air-fuel injector includes an outer swirler to introduce a first fraction of the air into the injection device to form the fuel-air mixture. The outer swirler consists of a plurality of fins defining channels therebetween, the sizes of the channel openings being made variable by a movable diaphragm which is rotatably attached to the injector.

The annular fairing member is rotatably attached to an upstream or forward portion of the combustion chamber such that it is rotationally movable about the longitudinal axis of symmetry of the combustion chamber. Connection means are provided between the annular member and each of the injector diaphragms such that rotation of the annular member causes substantially simultaneous rotation of each of the diaphragms. The annular member is movable by means of a control device comprising a single shaft and a fork member which interconnects the shaft with the annular member.

Bearing means are incorporated between the annular member and the combustion chamber so as to minimize the friction generated by the relative rotation of these elements. The bearing means can either be a sliding bearing made of heat-resistance, anti-frictional material, or a ball bearing structure.

DETAILED DESCRIPTION OF THE PREFERRED EMBODIMENTS

Figure 1:
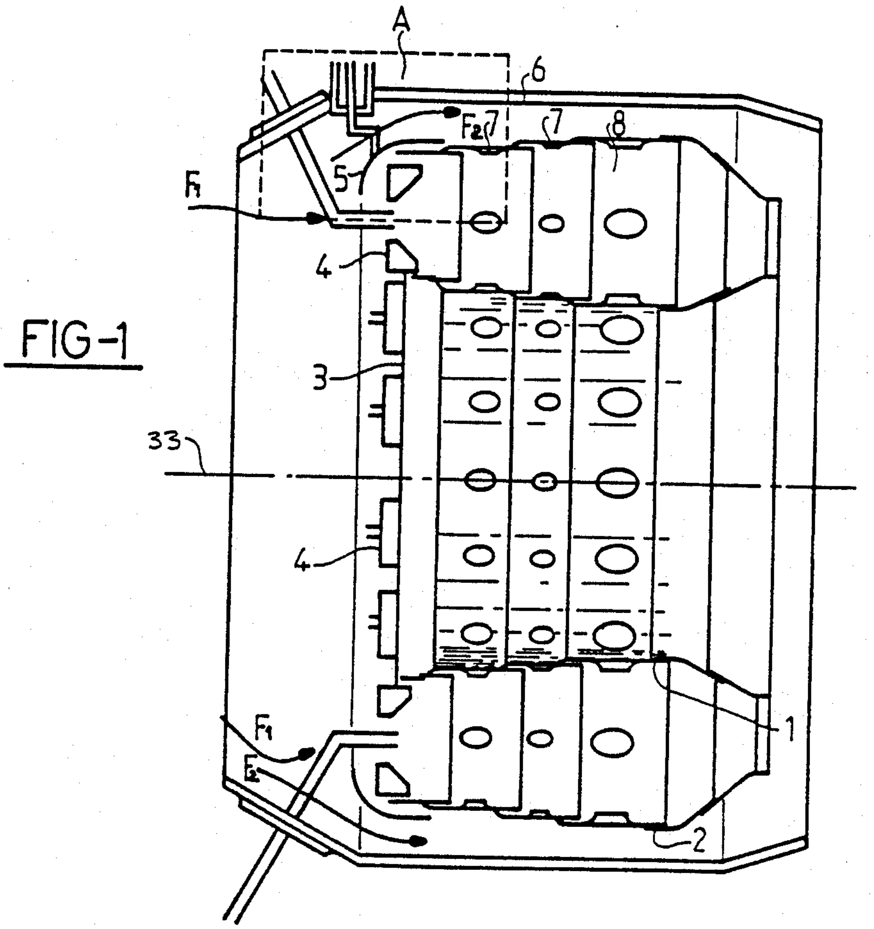
FIG. 1 is a longitudinal, sectional view of an annular combustion chamber of a turbojet engine incorporating the control system according to the invention.
Figure 4:
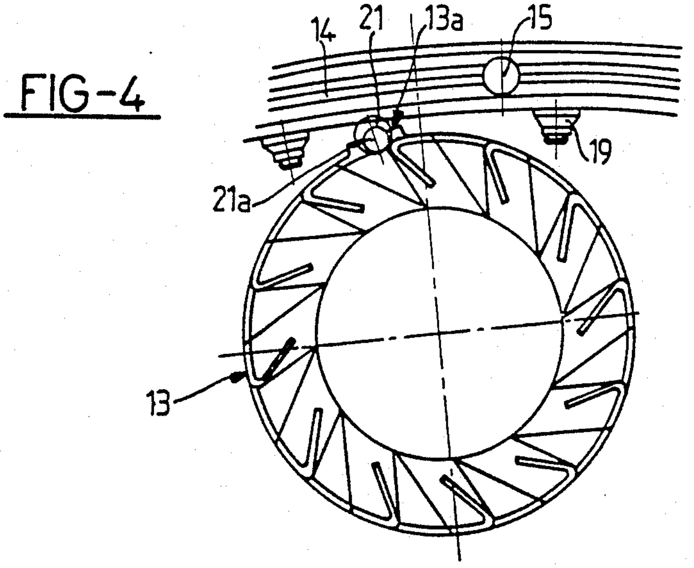
FIG. 4 is a partial front view showing the diaphragm and the control system taken along line IV–IV in FIG. 2.

FIG. 1 shows an annular combustion chamber for a turbojet engine which consists of an inner wall 1 and an outer wall 2, each of which are formed by several rings. The front or upstream end 3 of the combustion chamber receives a plurality of air-fuel injectors 4 which are regularly distributed in an annular array around the upstream end 3. The injector systems 4 will be described in more detail in relation to FIG. 2.

An annular member 5 having a curved cross-section generally approximating one-quarter of a circle, is mounted on the combustion chamber and is located adjacent to the upstream end 3. The annular member 5 serves to divert the air from the turbojet engine compressor (not shown), which is located to the left as seen in FIG. 1, into a first fraction $F_1$ which is directed into the air-fuel injectors 4, and a second fraction $F_2$ which is directed toward the annular space between the outer combustion chamber wall 2 and the chamber casing 6. This portion of the flow externally cools the combustion chamber walls and also enters the combustion chamber through mixing orifices 7 and dilution orifices 8 in known fashion to be mixed with the fuel vaporized by the injectors. As is well known in the art, this air also reduces the temperature of the exhaust gases emanating from the combustion chamber to minimize the temperature effects on the high pressure turbine stages (not shown) located downstream of the combustion chamber.

Figure 2:
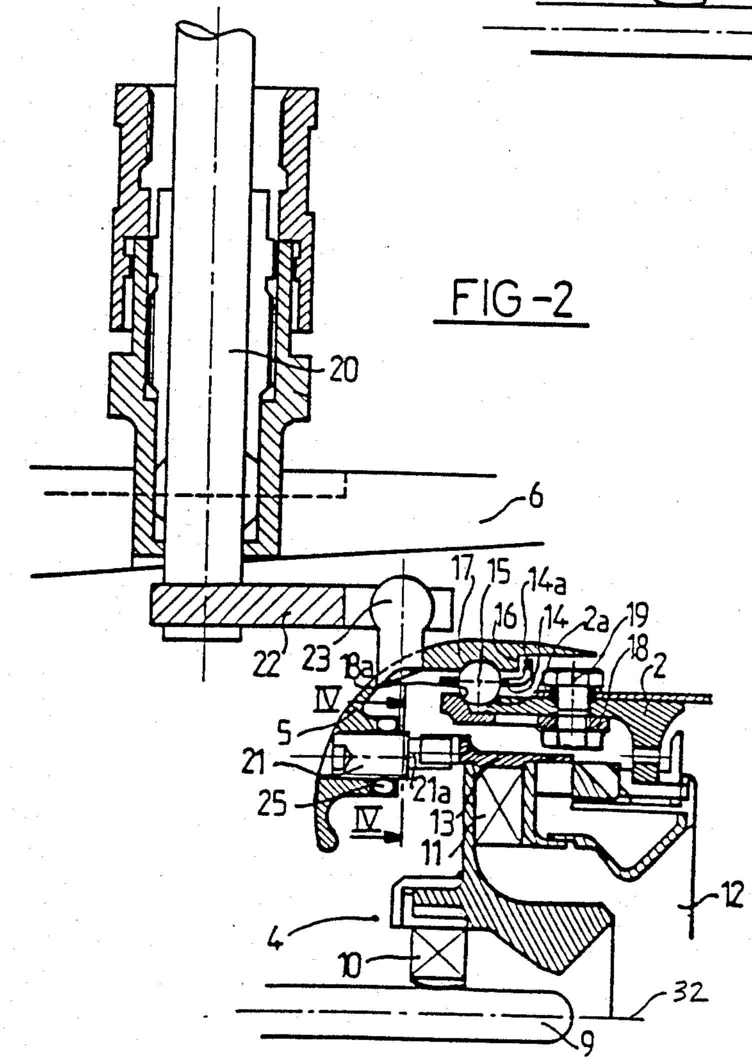
FIG. 2 is an enlarged, partial cross-sectional view of the portion A shown in FIG. 1 illustrating the control system according the the invention.

As shown in more detail in FIG. 2, each of the injector systems 4 comprises a central fuel injector 9 having a longitudinal axis 32 which extends generally parallel to the longitudinal axis of symmetry 33 of the combustion chamber (shown in FIG. 1). Each injector also comprises an inner swirler 10 and an outer swirler 11, each of which cooperate with the injector 9 to feed an atomized sheet of fuel to the intermediate bowl 12. A diaphragm 13 allows the continuous opening or closing of the outer swirler 11 such that the air flow matches the operational mode of the engine to minimize the pollution of the exhaust gases. Such injector systems, per se, are well known in the art, a particular example of which is shown in the aforementioned French Pat. No. 2,572,463.

The annular member 5 is rotatably mounted on the upstream portion of the outer wall 2 by a ball bearing structure consisting of a cylinder cage 14 which retains a plurality of balls 15 in position. The downstream portion 14*a* of this cage is outwardly curved so as to rest against a step 16 formed in annular member 5 to facilitate the assembly of the device as will be hereinafter discussed in more detail.

The plurality of balls 15 are in rolling contact with a first biconical circular track 17 formed on an inner facing portion of annular member 5, and a second biconical track defined by the frusto-conical upstream end portion 2*a* of outer wall 2 and a frusto-conical bearing portion 18a defined by an inner ring 18 located on the inside of outer wall 2.

The ring 18 defines a single orifice 18b through which the balls 15 are sequentially introduced into the holes of the cage 14. Ring 18 also defines a plurality of regularly distributed perforations 18*c* which are aligned with perforations 2*b* formed in the outer wall 2 to facilitate attachment of the inner ring 18 to the outer wall 2 by means of bolts 19.

The rotation of annular member 5 is achieved by a control system comprising a rotatable shaft 20 which passes through the chamber casing 6 and is rotatably supported therein, a link member 23 which extends substantially radially outwardly from the annular member 5 and a fork 22 which interconnects the innermost end of shaft 20 with the link member 23. The shaft 20 may be rotated by any known means located externally of casing 6 such as rack and pinion, a hydraulic jack and link, or known electro-hydraulic means controlled by the jet engine regulator.

The annular member 5 is interconnected with each of the diaphragms 13 by means of connecting stud having a threaded portion 21 and an eccentrically mounted end portion 21a. The threaded portion 21 is threadingly engaged with annular member 5 via threaded opening 34, while eccentric end 21*a* engages fork 13*a* of the diaphragm 13. The eccentric end 21*a* allows each of the individual connecting studs to be angularly adjusted individually such that each of the diaphragms can be adjusted to open or close simultaneously. Once the connecting stud has been properly oriented, lock nut 25 is threaded thereon against the inner side of annular member 5 to lock the stud in position.

Figure 3:
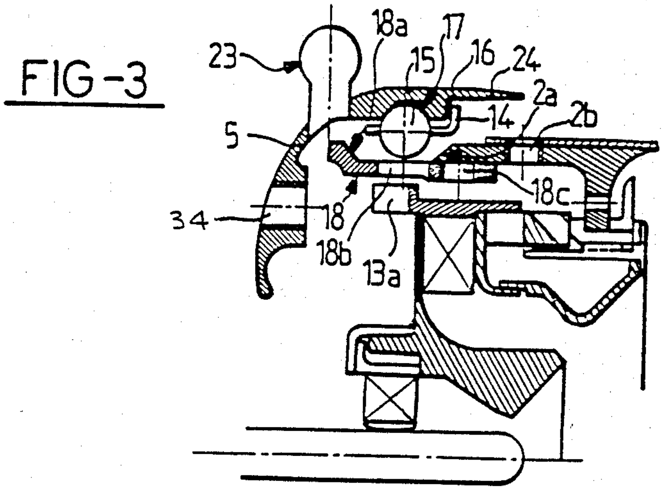
FIG. 3 is a partial, cross-sectional, view of the invention showing the components spaced apart as in the assembly procedure.

The control system according to the invention is assembled by first mounting each of the injectors 4, with their diaphragms 13, in the forward most or upstream end of the combustion chamber in known fashion. The inner ring 18 is then placed beneath the outer chamber wall 2 in the position shown in FIG. 3 such that the single ball-insertion orifice 18*b* is located upstream of the end of the outer wall 2. The cage 14 is then put in place, followed by the annular member 5. The balls 15 are then inserted one at a time throuh the orifice 18*b* and positioned within the holes of bearing cage 14. Inner ring 18 is free to rotate so as to permit the alignement of orifice 18*b* with each of the positioning holes in the cage 14.

After assembling all of the balls 15 in the cage 14, the inner ring 18 is moved downstream to the position shown in FIG. 2 such that the single orifice 18*b* is covered by the outer wall 2. Bolts 19 are then inserted through aligned openings 2*b* and 18*c* to affix the elements together. Annular member 5 may define a single notch 24 to permit the installation of the bolts 19. A single notch is sufficient, since annular member 5 may rotate with respect to the outer wall 2 during the installation process.

Once the ring 18 is in position, the second, inner biconical track is formed by the frusto-conical surfaces 2*a* and 18*a* to form the inner track for the balls 15. The annular member 5 is pushed towards the front end of the combustion chamber at the same time as the inner ring 18 thereby fixing the balls 15 between the outer track 17 and the inner track defined by bearing surfaces 2*a* and 18*a*.

Studs 21 are then threaded into bores 34 and the eccentric ends 21*a* are placed in the forks 13*a* of the individual diaphragms 13. The diaphragms are adjusted by moving all of them to their fully opened position (or fully closed position) whereupon lock nuts 25 can be tightened so as to clamp the studs 21 such that all of the injector diaphragms are synchronized properly. Finally, fork 22 of the control system is engaged with link member 23 and affixed to shaft 20.

Figure 5:
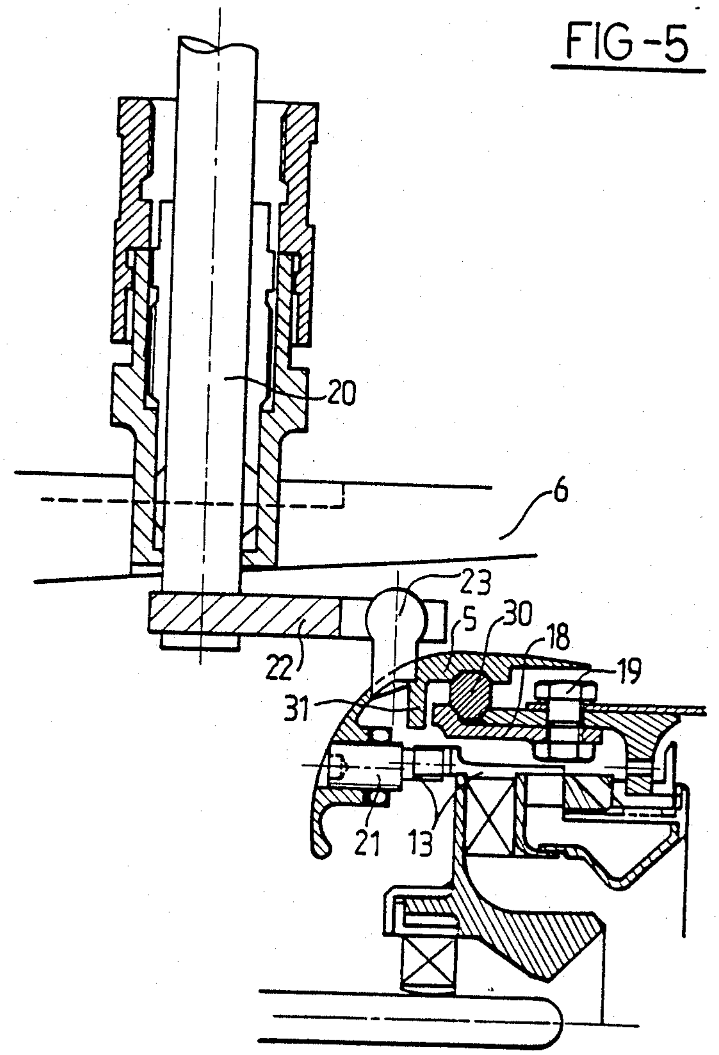
FIG. 5 is a partial, cross-sectional view showing an alternative embodiment of the control system according to the invention.

In an alternative embodiment shown in FIG. 5, the ball bearing structure is replaced by a solid ring 30 formed of a heat-resistant, anti-friction material. The ring 30 may have a substantially square cross-section with chamfered edges so as to engage the inner and outer bearing tracks. The remaining elements of this embodiment are the same as that previously described except for the elimination of the ball inserting orifice 18*b* from the ring 18.

In both of the aforedescribed embodiments, a seal for the bearing means may be incorporated such as by a radially inwardly extending flange 31 (shown in FIG. 5) extending from annular member 5. This flange will prevent impurities from entering the bearing surfaces.

The control system according the present invention offers the advantage of having only a minimum number of parts in the air flow path, namely the single fork 22 and the single link member 23. The rotation of the annular member 5 will simultaneously move all of the diaphragms in rotation about their respective axes while at the same time the annular member will guide the air without the air flow being hampered by additional elements inserted into the flow path.

In the embodiment utilizing the roller bearings, the structure is sufficiently simple to operate properly over the entire practical temperature range of the combustion chamber provided the clearances between the annular member, the balls and the inner ring are properly computed. The clearances are compensated by the axial force exerted by the air on the annular member and by the biconical shape of the inner and outer rolling tracks. Therefore, in operation, the annular member is self-centering relative to the combustion chamber while at the same time capable of absorbing relative expansions without hindering its rotational motion.

In view of the moderate forces exerted on the ball bearings (approximately 300daN for the annular member assembly) the materials used can remain the same as those employed in a conventional combustion chamber (such as the commercially known superalloy (HASTELLOY X) with possibly a hardening surface treatment for the conical tracks.

The control system according to the invention is applicable to injections systems having sector shaped bowls and to those having widened bowls, the only application criterion being the need to control a swirler diaphragm of variable geometry injection systems arranged in an annular array in the combustion chamber.

The foregoing description is provided for illustrative purposes only and should not be construed as in any way limiting this invention, the scope of which is defined solely by the appended claims.

What is claimed is:

1. In a turbojet engine having a chamber casing, an annular combustion chamber located within the chamber casing and defined by inner and outer walls about a longitudinal axis of symmetry with a plurality of air-fuel injectors arranged in an annular array at a forward end of the combustion chamber with their axes generally parallel to the longitudinal axis, each air-fuel injector equipped with an outer swirler defining openings to introduce a first air fraction into the injection system to form a combustible air-fuel mixture and a rotatable diaphragm to control the swirler openings, the improvements comprising:

(a) a generally annular fairing member having a curved cross-section so as to divide an air flow into a first portion which flows into the air-fuel injectors and a second portion which passes over the outer wall of the combustion chamber;

(b) mounting means to rotatably attach the annular member to the outer wall of the combustion chamber such that the annular member is located adjacent to the outer wall inside the chamber casing, and is capable of rotational movement about the longitudinal axis of symmetry;

(c) drive means operatively connected to the annular member to move the annular member in either direction about the longitudinal axis of symmetry; and, (d) connecting means connecting the annular member with each of the rotatable diaphragms such that rotational movement of the annular member causes substantially simultaneous rotational movement of the diaphragms.

2. The improved annular combustion chamber according to claim 1 wherein the drive means comprises:

(a) a single link member extending substantially radially outwardly from the annular member;

(b) a shaft adapted to rotate about its longitudinal axis, and, (c) a single fork member interconnecting the shaft and the single link member such that rotational movement of the shaft causes rotational movement of the annular member.

3. The improved combustion chamber according to claim 2 wherein the longitudinal axis of the shaft extends substantially perpendicular to the longitudinal axis of symmetry of the combustion chamber.

4. The improved combustion chamber according to claim 3 wherein the connecting means comprises a plurality of connecting studs, a connecting stud extending between the annular member and each of the rotatable diaphragms.

5. The improved combustion chamber according to claim 4 wherein each connecting stud comprises a threaded portion threadingly engaging the annular member and an end portion eccentric with respect to the threaded portion engaging the associated diaphragm.

6. The improved combustion chamber according to claim 5 further comprising bearing means interposed between the annular member and the outer wall of the combustion chamber.

7. The improved combustion chamber according to claim 6 further comprising an inner ring attached to the outer wall of the combustion chamber, the outer wall and the inner ring defining a first, inner biconical bearing race; and a second, outer biconical bearing race defined by the annular member such that the bearing means is disposed between the first and second races.

8. The improved combustion chamber according to claim 7 wherein the bearing means comprises a ring of heat resistant, anti-friction material.

9. The improved combustion chamber according to claim 7 wherein the bearing means comprises a plurality of ball bearings in rolling contact with the first and second races.

10. The improved combustion chamber according to claim 9 wherein the inner ring defines an opening to facilitate the insertion of the ball bearings between the first and second races.

11. The improved combustion chamber according to claim 1 wherein the connecting means comprises a plurality of connecting studs, a connecting stud extending between the annular member and each of the rotatable diaphragms.

12. The improved combustion chamber according to claim 11 wherein the connecting stud comprises a threaded portion threadingly engaging the annular member and an end portion eccentric with respect to the threaded portion engaging the associated diaphragm.

13. The improved combustion chamber according to claim 1 further comprising bearing means interposed between the annular member and the outer wall of the combustion chamber.

14. The improved combustion chamber according to claim 13 further comprising an inner ring attached to the outer wall of the combustion chamber, the outer wall and the inner ring defining a first, inner biconical bearing race, and a second, outer biconical bearing race defined by the annular member such that the bearing means is disposed between the first and second races.

15. The improved combustion chamber according to claim 14 wherein the bearing means comprises a ring of heat resistant, anti-friction material.

16. The improved combustion chamber according to claim 14 wherein the bearing means comprises a plurality of ball bearings in rolling contact with the first and second races.

17. The improved combustion chamber according to claim 16 wherein the inner ring defines an opening to facilitate the insertion of the ball bearings between the first and second races.

* * * * *

UNITED STATES PATENT AND TRADEMARK OFFICE
CERTIFICATE OF CORRECTION

PATENT NO. : 4,825,641

DATED : May 2, 1989

INVENTOR(S) : Gerard M. MANDET et al

It is certified that error appears in the above-identified patent and that said Letters Patent is hereby corrected as shown below:

Column 2, line 3, delete "diaphrams" and insert --diaphragms--.

Column 2, line 44, delete "the the" and insert --to the--.

Column 3, line 34, delete "cylinder" and insert --cylindrical--.

Signed and Sealed this

Twenty-sixth Day of December, 1989

*Attest:*

JEFFREY M. SAMUELS

*Attesting Officer* *Acting Commissioner of Patents and Trademarks*